United States Patent [19]

Hareyama et al.

[11] Patent Number: 4,846,125
[45] Date of Patent: Jul. 11, 1989

[54] INTERNAL COMBUSTION ENGINE

[75] Inventors: Kisichiro Hareyama; Shokichi Hareyama, both of Noda, Japan

[73] Assignee: Kabushiki Kaisha Hareyama Giken, Japan

[21] Appl. No.: 184,288

[22] Filed: Apr. 21, 1988

[30] Foreign Application Priority Data

Oct. 24, 1986 [JP] Japan .................. 61-253194
Nov. 21, 1986 [JP] Japan .................. 61-277908

[51] Int. Cl.$^4$ ........................... F02B 19/02
[52] U.S. Cl. .......................... 123/292; 123/255
[58] Field of Search ............. 123/143 B, 254, 255, 123/292

[56] References Cited

U.S. PATENT DOCUMENTS

| | | | |
|---|---|---|---|
| 4,300,497 | 11/1981 | Webber | 123/254 |
| 4,372,264 | 2/1983 | Trucco | 123/255 |
| 4,401,072 | 8/1983 | Ito et al. | 123/292 |
| 4,406,260 | 9/1983 | Burley | 123/292 |
| 4,424,780 | 1/1984 | Trucco | 123/255 |

FOREIGN PATENT DOCUMENTS

| | | |
|---|---|---|
| 276193 | 7/1988 | European Pat. Off. . |
| 495995 | 4/1930 | Fed. Rep. of Germany . |
| 2855968 | 7/1980 | Fed. Rep. of Germany . |
| 548967 | 1/1923 | France . |
| 176319 | 10/1982 | Japan . |
| 969501 | 9/1964 | United Kingdom . |
| 2079850 | 1/1982 | United Kingdom ........ 123/292 |

Primary Examiner—Tony M. Argenbright
Attorney, Agent, or Firm—McGlew & Tuttle

[57] ABSTRACT

An internal combustion engine includes a fuel activation chamber disposed near a main combustion chamber and a valve disposed between the fuel activation chamber and the main combustion chamber to open and close therebetween. The valve is opened by movement of a valve body thereof to the fuel activation chamber side.

5 Claims, 5 Drawing Sheets

INTERNAL COMBUSTION ENGINE

FIELD OF THE INVENTION AND RELATED ART STATEMENT

The present invention relates to an internal combustion engine, and more particularly to an internal combustion engine including a fuel activation chamber disposed near a main combustion chamber.

More specifically, the present invention concerns an internal combustion engine including a fuel activation chamber disposed near a main combustion chamber and a valve disposed between the fuel activation chamber and the main combustion chamber to open and close therebetween.

An internal combustion engine involves, for example as a combustion system of a compression ignition engine, a direct injection type engine, a precombustion type engine, a swirl chamber type engine and an air chamber type engine. However, in any combustion system, since liquid fuel is directly injected into a combustion chamber, the compression ignition combustion may be started before the injection fuel is uniformly mixed with air. In this case, hydrocarbon in imperfect combustion is produced in the combustion chamber and black smoke is exhausted from the compression ignition engine. Accordingly, the combustion efficiency is reduced and air pollution is effected.

Further, since most of the current compression ignition engines are adapted to be ignited with a high compression ratio and in a high temperature, much nitrogen oxide (Nox) is exhausted and air pollution is also effected.

The present inventor has proposed an internal combustion engine including a fuel activation chamber disposed near a main combustion chamber and a valve disposed between the activation chamber and the main combustion chamber to open and close therebetween.

The valve of the above internal combustion engine is structured to be opened and closed by movement of a valve body thereof to the main combustion chamber side from a valve seat thereof.

With the above valve structure, since the flow way of gasified fuel to the main combustion chamber from the activation chamber is largely bent by the valve body, the flow of gasified fuel is largely throttled with loss and accordingly it was difficult to improve the rotational number and the maximum output power of the internal combustion engine.

OBJECT AND SUMMARY OF THE INVENTION

The present invention has been made in view of such circumstances and inconvenience as described above and it is a first object of the present invention to provide an internal combustion engine capable of further improving the rotational number and the maximum output power.

In order to achieve the first object, the present invention provides an internal combustion engine including a fuel activation chamber disposed near a main combustion chamber and a valve disposed between the fuel activation chamber and the main combustion chamber to open and close therebetween, wherein the valve is structured to be opened by movement of a valve body thereof to the fuel activation chamber side.

Further, it is a second object of the present invention to provide an internal combustion engine having enhanced combustion efficiency and capable of greatly reducing black smoke and nitrogen oxide contained in exhaust gas.

In order to achieve the second object, the present invention provides an internal combustion engine including a fuel activation chamber disposed near a main combustion chamber and a valve disposed between the fuel activation chamber and the main combustion chamber to open and close therebetween, comprising a valve body of the valve disposed to be able to be moved to the fuel activation chamber side with respect to a valve seat of the valve and compression surfaces formed on respective wall surfaces of the valve body and the fuel activation chamber in opposed relationship with each other to squish activated fuel in the fuel activation chamber between both of the compression surfaces so that the activated fuel is blown into the main combustion chamber when the valve body is moved to the fuel activation chamber side to open the valve.

DETAILED DESCRIPTION OF PREFERRED EMBODIMENTS

Figure 1:
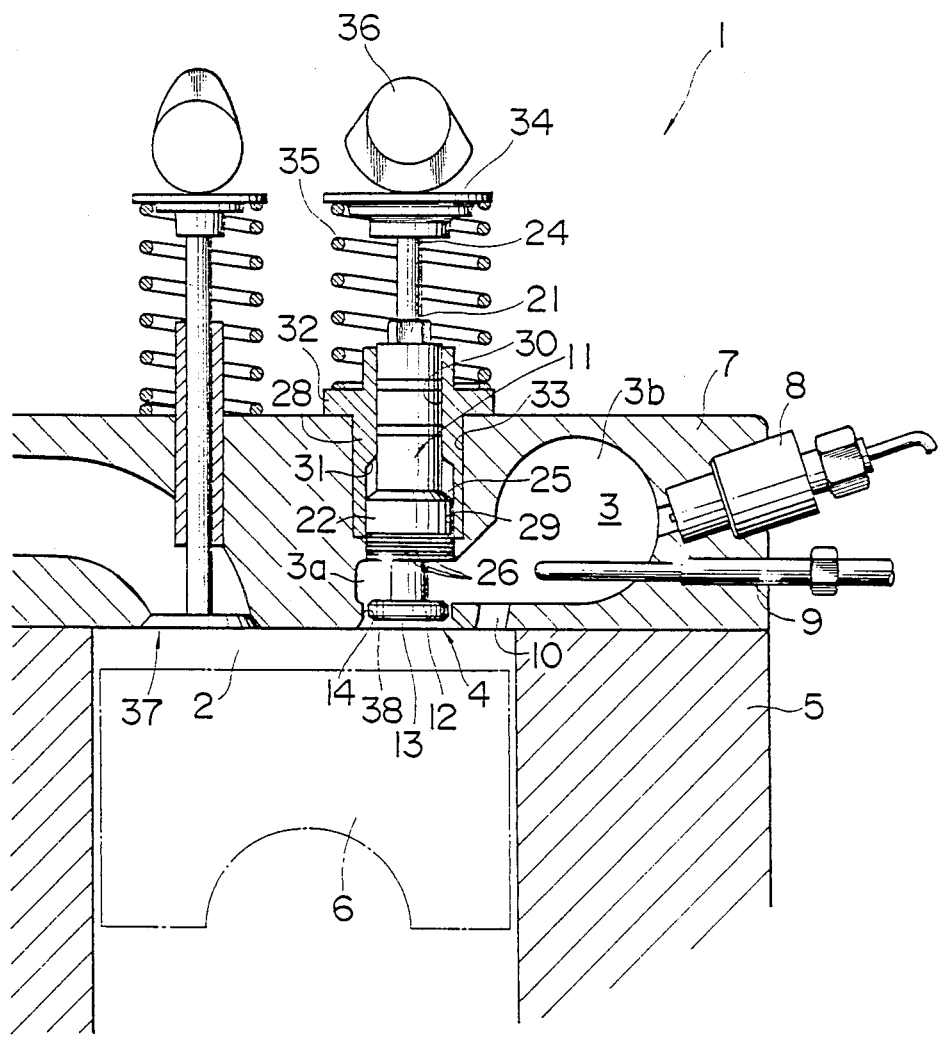
FIG. 1 is a sectional view of an embodiment of an internal combustion engine according to the present invention.
Figure 2:
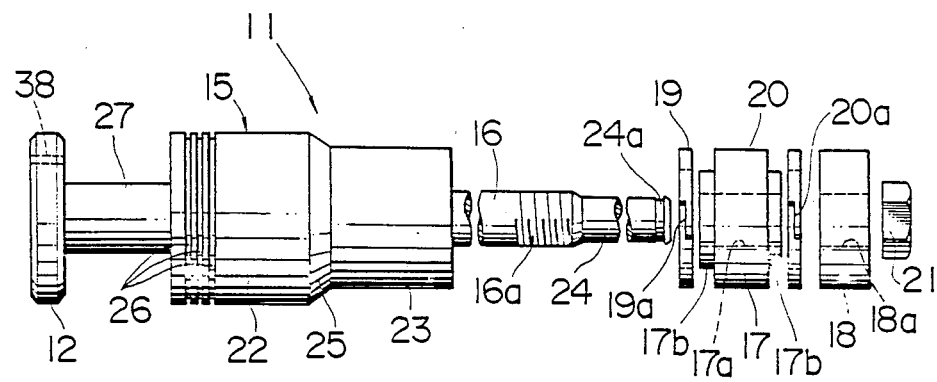
FIG. 2 is a front view of a valve body which is used in the internal combustion engine of FIG. 1.

In FIGS. 1 and 2, an internal combustion engine 1 is a compression ignition engine and comprises a fuel activation chamber 3 disposed above a main combustion chamber 2 thereof and a valve 4 disposed between the activation chamber 3 and the main combustion chamber 2 to open and close therebetween.

The main combustion chamber 2 is enclosed with a cylinder block 5, a piston 6 and a cylinder head 7.

The activation chamber 3 is formed in the cylinder head 7 with a thick small disclike chamber 3a formed in one end thereof and a spherical chamber 3b formed in the other end thereof. A fuel injection nozzle 8 and a glow plug 9 are disposed so that one ends thereof are exposed or projected in the spherical chamber 3b.

The activation chamber 3 communicates with the main combustion chamber 2 through a passage 10 at the central portion of the chamber 3. The passage 10 is formed in the cylinder head 7 slightly slant toward the spherical chamber 3b.

The valve 4 comprises a substantially disclike end portion 12 formed at an end of the valve body 11 and a peripheral portion 14 defining a periphery of a hole 13 formed in the cylinder head 7 and having a diameter slightly larger than that of the end portion 12. The end portion 12 can be inserted or moved in the peripheral portion 14 vertically. The peripheral portion 14 substantially serves a function of a valve seat of the valve 4.

As shown in FIG. 2, the valve body 11 includes a middle-diameter rod 16 of a body 15 thereof which is inserted into a pair of cylindrical members 17 and 18 and a pair of rings 19 and 20 which are tightened by a nut 21. The body 15 of the valve body includes a first annular surface 25 disposed between a large-diameter portion 22 and a middle-diameter portion 23 and inclined toward the rod 16. The large-diameter portion 22 is formed with three annular grooves 26 at an end thereof near the end portion 12. The large-diameter portion 22 is coupled with the end portion 12 through a small-diameter portion 27. The small chamber 3a of the activation chamber 3 is formed into a ring by the small-diameter portion 27 when the valve 4 is closed.

An end of the rod 16 near a small-diameter rod 24 is formed with a thread portion 16a to which the nut 21 is engaged. The small-diameter rod 24 includes an end to which a cotter groove 24a is formed.

The cylindrical members 17 and 18 include holes 17a and 18a, respectively, having a diameter which is substantially identical with that of the rod 16. The cylindrical member 17 is formed, at both ends thereof, with protrusions 17b on which the rings 19 and 20 are fitted. The rings 19 and 20 are formed with crank-shaped gaps 19a and 20a.

The cylindrical members 17 and 18 and the rings 19 and 20 are supported between a side end 23a of the middle-diameter portion 23 and the nut 21 to be fixed to the body 15.

It is desirable that the rings 19 and 20 can be slightly slided by provision of proper clearance.

The valve body 11 structured above is fitted in the cylinder head 7 through a sleeve 28.

The sleeve 28 includes a large-diameter hole 29, a small-diameter hole 30 and a second annular surface 31 disposed between the holes 29 and 30 and inclined toward the end portion 12 of the valve body 11. The second annular surface 31 is formed in opposed relationship with the first annular surface of the valve body 11. More particularly, the first and second annular surfaces 25 and 31 are opposed in parallel with each other and are formed to be able to be brought into close contact with each other. The large-diameter portion 22 of the valve body 11 is slidably fitted into the large-diameter hole 29 of the sleeve 28, while the middle-diameter portion 23, the cylindrical members 17 and 18 and the rings 19 and 20 are fitted into the small-diameter hole 30.

Further, the sleeve 28 includes a flange 32 formed on the periphery thereof. The sleeve 28 is forcedly inserted into a hole 33 formed in the cylinder head 7 and is positioned to the cylinder head 7 through the flange 32.

The hole 33 of the cylinder head 7 communicates with the small chamber 3a of the activation chamber 3.

On the other hand, a tappet 34 is fixedly fitted into the cotter groove 24a formed in the end of the small-diameter rod 24 of the valve body 11. A spring 35 is disposed between a flange 34a formed around the tappet 34 and the flange 32 of the sleeve 28 so that the valve body 11 is urged to be moved upward by resilience of the spring 35.

A cam which is rotated by movement of a crankshaft not shown of the internal combustion engine in accordance with a predetermined ignition timing abuts against the tappet 34.

An intake valve 37 is disposed above the main combustion chamber 2 at this side in FIG. 1 and an exhaust valve not shown is disposed behind the intake valve.

Operation of the internal combustion engine 1 is now described.

When the internal combustion engine 1 is in the compression stroke, compressed air in the main combustion chamber 2 is injected into the spherical chamber 3b of the activation chamber 3 through the passage 10 to form a swirl. Further, at this time, fuel is injected into the activation chamber 3 through the fuel injection nozzle 8. The injected fuel is heated by the glow plug 9 and is joined in the swirl in the activation chamber 3 so that gasification thereof is facilitated.

The activated fuel as described above is injected into the main combustion chamber 2 through the passage 10 after the top dead point for the compression (0°-50°) and the valve body 11 is moved up by the resilience of the spring 35 in response to the rotation of the cam 36 to inject the activated fuel into the main combustion chamber 2 through the opened valve 4.

The valve 4 is opened when the end portion 12 thereof is moved up and is free from the hole 13, and accordingly the fuel activated in the chamber 3 is much injected into the main combustion chamber 2. Combustion takes place in the main combustion chamber 2 in response to the injection of the activated fuel.

At this time, the fuel smoothly flows from the activation chamber 3 into the main combustion chamber 2 without any flow curved largely due to the end portion 12 and since a flow section of the passage 10 is added to a flow section of the hole 13 to obtain a large flow section, the fuel smoothly flows without any large loss.

On the other hand, the valve body 11 is moved up so that the first annular surface 25 of the valve body 11 is brought into close contact with the second annular surface 31 of the sleeve 28. The gap between the valve body 11 and the sleeve 28 is completely sealed by the close contact of the annular surfaces 25 and 31. Consequently, leakage of the activated fuel from the activation chamber 3 through the gap to the outside is effectively prevented in cooperation with the seal effect by the annular grooves 26.

Thereafter, the valve 4 is closed after completion of the exhaust stroke and the same operation as described above is then repeated.

The internal combustion engine 1 of the embodiment may be provided with a hole 38 formed in the end portion 12 of the valve body 11 in place of the passage 10 or together with the passage 10 (refer to FIG. 2). The hole 38 serves to inject the compressed air from the main combustion chamber 2 into the activation chamber 3. In this case, the activation chamber 3 may be formed of only the small chamber 3a without the spherical chamber 3b and the fuel injection nozzle 8 and the glow plug 9 may be exposed or projected in the small chamber 3a.

Figure 3:
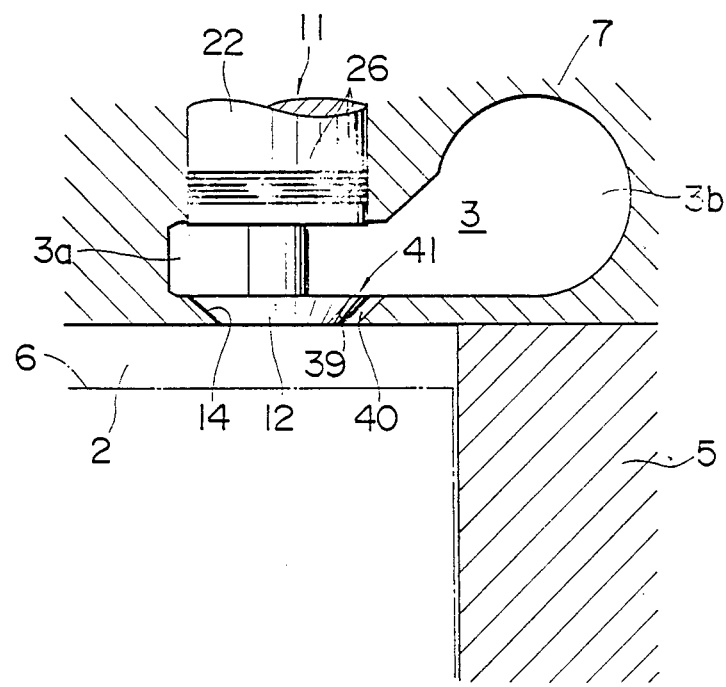
FIG. 3 illustrates another passage used in the internal combustion engine of FIG. 1.

FIG. 3 shows another passage 41 corresponding to the passage 10 of the embodiment of FIG. 1 and consisting of a notch 39 formed in part of the end portion 12 of the valve body 11 and a notch 40 formed in part of the peripheral portion 14 of the cylinder head 7 in corresponding relationship with the notch 39. In FIG. 3, elements having the same function as that of the elements shown in FIGS. 1 and 2 are given like numerals and detailed description thereof is omitted.

Figure 4:
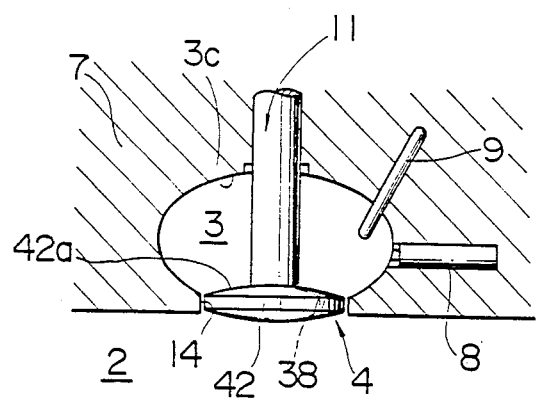
FIGS. 4 and 5 are sectional views showing other sealing structures between a valve body and a cylinder head of the internal combustion engine of FIG. 1.
Figure 5:
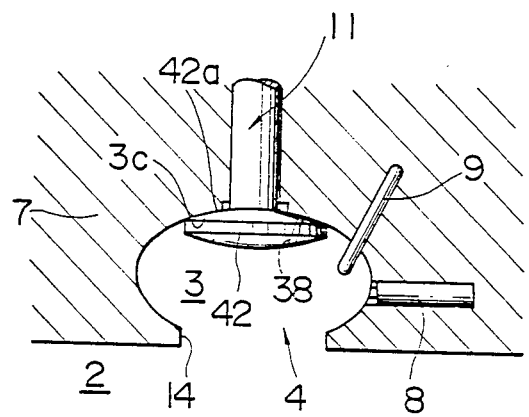

FIGS. 4 and 5 shows a structure in which an upper surface 42a of an end portion 42 of the valve body 11 comes into close contact with a ceiling 3c of the activation chamber 3 directly to seal between the valve body 11 and the cylinder head 7.

In this structure, the upper surface 42a of the end portion 42 is formed with a curved surface corresponding to the ceiling 3c of the activation chamber 3. FIG. 4 shows the valve 4 in the closed state and FIG. 5 shows the valve 4 in the opened state. In FIGS. 4 and 5, elements having the same function as that of the elements shown in FIG. 1 are given like numerals.

When the valve body 11 is structured as shown in FIGS. 4 and 5, the structure of the valve body 11 can be simplified.

As described above, according to the internal combustion engine of the present invention, since it is structured that the valve body is moved to the activation chamber side to open the valve, the fuel flows from the activation chamber to the main combustion chamber without large loss. Accordingly, the rotational number and the maximum output power of the internal combustion engine can be improved. Further, in the present invention, since the valve body is structured to be moved up, part of the valve body can be brought into close contact with part of the cylinder head to seal therebetween when the valve body is moved up.

Figure 6:
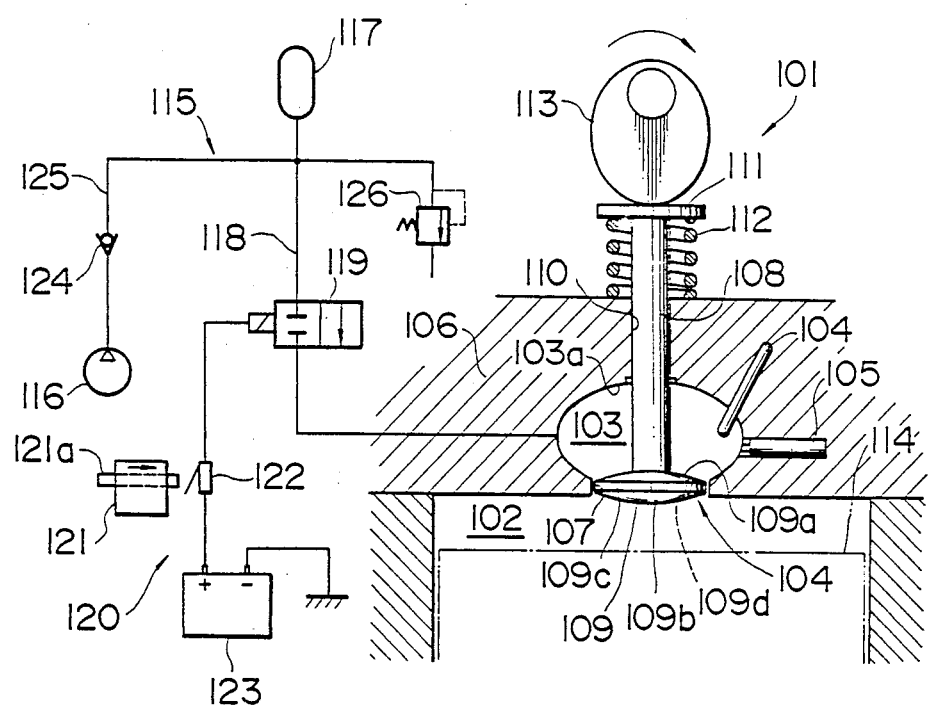
FIGS. 6 to 8 are sectional views showing part of another embodiment of an internal combustion engine according to the present invention.
Figure 7:
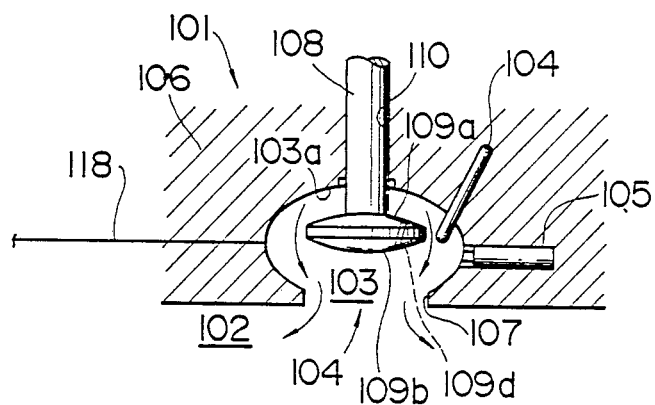
Figure 8:
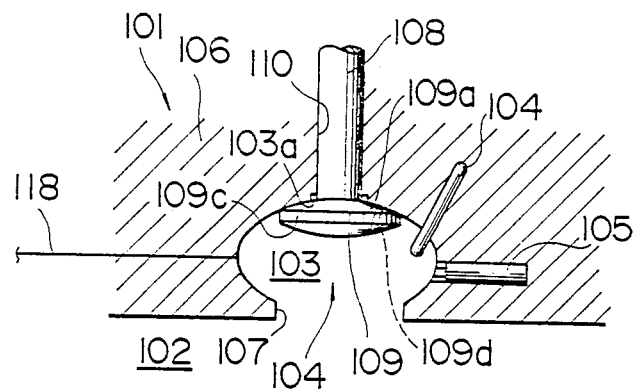

FIGS. 6 to 8 illustrate a further embodiment of the present invention.

An internal combustion engine 101 of this embodiment is a compression ignition engine such as a diesel engine.

The internal combustion engine 101 includes a fuel activation chamber 103 disposed above a main combustion chamber 102.

The activation chamber 103 communicates with the main combustion chamber 102 through a valve 104.

The activation chamber 103 is formed into a substantially elliptic shape, and a glow plug 104' and a fuel injection nozzle 105 are exposed or projected in the activation chamber 103.

The valve 104 includes a valve seat 107 formed of a hole formed in a bottom of the cylinder head 106 so that the activation chamber 103 is coupled with the main combustion chamber 102 and a valve body 109 provided in an end of a rod 108 extending from an upper portion of the cylinder head 106.

The rod 108 extends upward from the activation chamber 103 and is slidably inserted into a hole 110 formed in the cylinder head 106.

The valve body 109 includes an upper surface 109a and a bottom surface 109b both formed into a spherical surface.

Specifically, the upper surface (compression surface) 109a of the valve body 109 and a ceiling (compression surface) 103a of the activation chamber 103 are opposed to each other so as to compress or squish the space between the upper surface 109a and the ceiling 103a when the valve 104 is opened.

In addition, the upper surface 109a of the valve body 109 is formed with the same curvature as that of the ceiling 103a of the activation chamber 103. When the valve body 109 is moved to the uppermost portion of the activation chamber 103, the upper surface 109a and the ceiling 103a are brought into close contact with each other and the activation chamber 103 is sealed from the hole 110 and the outside.

The valve seat 107 and a side surface 109e of the valve body 109 are opposed in parallel with each other and are directed in a perpendicular direction to an axial direction of the rod 108. Accordingly, the valve body 109 is structured to be able to be moved vertically with respect to the valve seat 107.

In the embodiment, the valve body 109 is provided slidably to the upper portion of the valve seat 107, that is, to the side of the activation chamber 103.

The valve body 109 is always urged to be moved upward by a spring 112 disposed between a plate 111 mounted to an upper end of the rod 108 and the cylinder head 106.

Further, a cam 113 which is rotated at a predetermined timing by the motive power of a crankshaft, for example, not shown abuts against the plate 111. The cam 113 may be any shape as far as the cam is formed to open the valve 104 at the ignition timing.

The valve body 109 is formed with a small hole 109d which is formed to introduce the compressed air in the main combustion chamber 102 by a piston 114 into the activation chamber 103 when the valve 104 is opened.

The internal combustion engine 101 further comprises compressed air feeding means 115 which feeds the compressed air into the activation chamber 103 at a predetermined timing.

The compressed air feeding means 115 comprises a pump 116 which compresses part of fresh air obtained through an air cleaner, a tank 117 which stores air compressed by the pump, a conduit 118 which leads the compressed air to the activation chamber 103 from the tank, a normally closed solenoid valve 119 disposed in the conduit 119, and a controller 120 which controls to open and close the solenoid valve 119.

The pump 116 is driven by the motive power from the crank shaft not shown.

The controller 120 operates to open the solenoid valve 119 and feed the compressed air to the activation chamber 103 when the engine is accelerated or burdened with a load.

The embodiment utilizes the fact that a control rack 121a of a fuel feeding pump 121 is largely moved in one direction upon the acceleration state or the burdened state of the engine. An actuator of a switch 122 is pressed by the movement of the control rack 121a to open the switch so that an operation current flows from a battery 123 through the switch to the solenoid valve 19.

Numeral 124 denotes a check valve disposed in the conduit 125 coupling between the pump 116 and the tank 117 so that the compressed air does not reversely flow from the tank 117 to the pump 116 and numeral 126 denotes a relief valve which maintains pressure in the tank 117 constant.

The characteristic operation and effects of the internal combustion engine according to the present embodiment are summarized as follows (refer to FIGS. 7 and 8):

(1) Preactivation of injected fuel

The fuel is relatively early injected from the fuel injection nozzle 105 into the small fuel activation chamber 103 having remaining gas of a high temperature contained therein and a wall surface heated to a high temperature and is premixed with the compressed air in the compression stroke injected from the small hole 109d of the valve body 109 or the valve 104 and preheated to form uniform mixture. It is preferable that the diameter of the small hole 109d is formed relatively small since the fuel is self-ignited in the fuel activation chamber in the same manner as the so-called diesel combustion when the hole 109d is too large.

(2) Control of ignition timing by valve 104

The uniformly activated (premixed and preheated) mixture existing above the valve body is subjected to the squish operation between the upper surface 109a of the valve body 107 and the ceiling 103a of the activation chamber 103, when the valve body 109 of the valve 104 provided near the activation chamber 103 is move up, to be injected from the opened valve hole into the main combustion chamber 102 and is brought into contact with fresh air to be immediately ignited and burned.

Accordingly, the open and close timing of the valve 104 can be selected properly so that the ignition of the diesel engine can be controlled in optimum.

Further, since the open and closed timing of the valve 104 and the fuel feeding timing can be controlled so that fuel and air are premixed and preheated to be activated in the activation chamber 103, various gases can be gasified to optimum states suitable for various internal combustion engines. Accordingly, various fuel can be employed and the present invention can be generally applied to the internal combustion engine.

(3) Premix combustion by activation

A quiet premix combustion can be achieved without diesel knocking particular to the diesel combustion and with less exhaust gas and particularly black smoke is not almost produced. Accordingly, since the engine can be operated at a high speed rotation and the compression ratio thereof can be reduced slightly, the weight of the engine can be reduced. Further, the excess coefficient can approach 1.0 and accordingly the output power of the engine can be improved.

Figure 9:
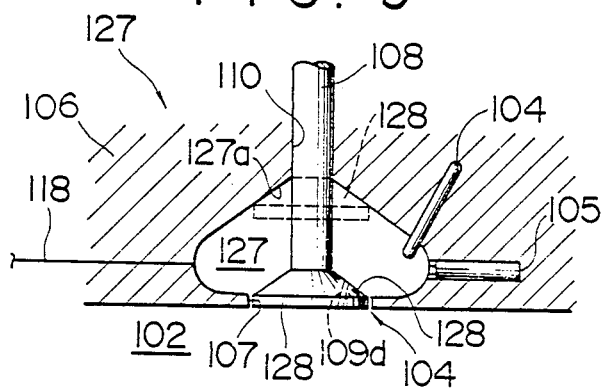
FIG. 9 is a sectional view showing part of still another embodiment of an internal combustion engine according to the present invention.

FIG. 9 shows another embodiment of the internal combustion engine according to the present invention. In FIG. 9, elements having the same function as that of the elements of FIG. 6 are designated by like numerals and detailed description thereof is omitted.

The internal combustion engine 127 of the embodiment includes a fuel activation chamber 128 and a valve body 129 which are both formed into a substantially conical shape in section.

In the embodiment, an upper surface 129a of the valve body 129 and the ceiling surface 128a of the activation chamber 128 are opposed to each other so that air existing between the upper surface 129a and the ceiling 128a can be compressed or squished and both of the surfaces 129a and 128a are further formed to be brought into close contact with each other to seal therebetween when the valve body 129 is in the uppermost position (as shown by dot line of FIG. 9).

Figure 10:
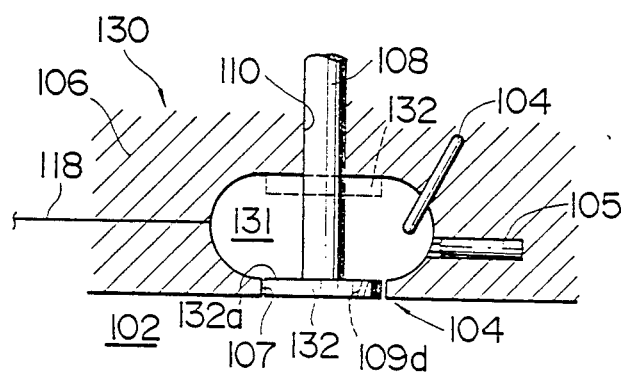
FIG. 10 is a sectional view showing part of a further embodiment of an internal combustion engine according to the present invention.

FIG. 10 shows a still further embodiment of the internal combustion engine according to the present invention. In FIG. 10, elements having the same function as that of the elements of FIG. 1 are designated by like numerals and detailed description thereof is omitted.

The internal combustion engine 130 of the embodiment includes a fuel activation chamber 131 which is formed into a substantially cylindrical shape with an elliptic shape in section and a valve body 132 which is formed into a cylindrical shape or a disclike shape.

In the embodiment, an upper surface 132a of the valve body 132 and a ceiling surface 131a of the activation chamber 131 are also opposed to each other so that air existing between both of the surfaces 132a and 131a can be compressed or squished. Further, when the valve body 132 is in the uppermost position (as shown by dot line of FIG. 10), both of the surfaces 132a and 131a are formed to be brought into close contact with each other to seal therebetween.

In the embodiment, while the accelerated state or the loaded state of the internal combustion engine is detected in accordance with the movement of the control rack 121a of the fuel feeding pump 121, the present invention is not limited thereto and it may be detected on the basis of a depression amount of the accelerator pedal or an angular movement amount of a throttle valve and a choke valve in a calibrator or a movement amount of a pump lever of an acceleration pump in the calibrator. That is, as far as the accelerated state (or the loaded state) of the internal combustion engine can be detected, any manner may be adopted.

In addition, the internal combustion engine according to the present invention may be any of two- or four-cycle engine and further may be the ordinary petrol engine (Otto cycle) or the diesel engine.

As described above, according to the internal combustion engine of the present invention, since the fuel can be premixed and activated in the fuel activation chamber in a high pressure and a high temperature, the combustion efficiency can be increased in the decreased state of the compression ratio as compared with the conventional internal combustion engine, particularly the compression ignition engine. Accordingly, black smoke and nitrogen oxide (Nox) can be reduced and air pollution due to exhaust of black smoke and nitrogen oxide can be prevented. Moreover, generation of the diesel knocking can be prevented and the acceleration performance can be improved while preventing exhaust of much black smoke in the acceleration state or the loaded state.

Further, the compressed air feeding means is provided additionally so that the activation of fuel in the activation chamber can be improved and the activated fuel can be preignited effectively, thereby capable of improving the combustion efficiency greatly.

What is claimed is:

1. An internal combustion engine including a fuel activation chamber disposed near a main combustion chamber and a valve disposed between the fuel activation chamber and the main combustion chamber to open and close therebetween, said valve being opened by movement of a valve body of said valve to said fuel activation chamber side, said valve including a support for supporting said valve body in sealing engagement therewith, sealing said fuel activation chamber fuel-tight when said valve is closed, a pair of surfaces being formed in said support and said valve body, respectively, which surfaces are in opposed relationship with each other so that a gap between said valve body and said support is sealed with respect to said fuel activation chamber when said valve is opened and said surface of said valve body abuts against said surface of said support.

2. An internal combustion engine according to claim 1 in which said support comprises a cylindrical sleeve having a cylindrical cavity wall portion of large diameter axially spaced from a cylindrical cavity wall portion of small diameter and said valve body has cylindrical body wall portions of large and small diameter correspondingly axially spaced to the wall portions of the sleeve cavity and received in respective sleeve cavities as an axially sliding fit, the surfaces being annular and defining shoulders joining the large and small diameter wall portions of the sleeve and valve body, respectively, so that the abutment of the surfaces limits the sliding movement of the valve body in one axial direction.

3. An internal combustion engine including a fuel activation chamber disposed near a main combustion chamber and a valve disposed between the fuel activation chamber and the main combustion chamber to open and close therebetween, said valve being opened by movement of a valve body of said valve to said fuel activation chamber side, compression surfaces formed on said valve body and a wall surface of said fuel activation chamber, respectively, in opposed relationship with each other whereby activated fuel in said fuel activation chamber is squished between both of said compression surfaces to be injected into said main combustion chamber when said valve body is moved to said fuel activation chamber side to open said valve.

4. An internal combustion engine according to claim 3 in which a passage extends between the activation chamber and the main combustion chamber permitting air from the main combustion chamber to be forced into the activation chamber when the valve is in closed condition, during a compression stroke.

5. An internal combustion engine including a fuel activation chamber disposed near a main combustion chamber and a valve disposed between the fuel activation chamber and the main combustion chamber to open and close therebetween, said valve being opened by movement of a valve body of said valve to said fuel activation chamber side, said valve including a support for supporting said valve body in sealing engagement therewith, sealing said fuel activation chamber fuel-tight when said valve is closed, a pair of surfaces being formed in said support and said valve body, respectively, which surfaces are in opposed relationship with each other so that a gap between said valve body and said support is sealed with respect to said fuel activation chamber when said valve is opened and said surface of said valve body abuts against said surface of said support, a passage extending between the activation chamber and the main combustion chamber permitting air from the main combustion chamber to be forced into the activation chamber when the valve is in closed condition, during a compression stroke.

* * * * *